United States Patent [19]

Wong

[11] Patent Number: 5,569,906
[45] Date of Patent: Oct. 29, 1996

[54] PHOTOELECTRIC CONTROL STRUCTURE FOR LINEAR TRANSMISSION DEVICES

[75] Inventor: Ron Wong, Taipei Hsien, Taiwan

[73] Assignee: Jaeger Industrial Co., Ltd., Taipei Hsien, Taiwan

[21] Appl. No.: 455,601

[22] Filed: May 31, 1995

[51] Int. Cl.⁶ ................. G01J 1/32; G01D 5/34
[52] U.S. Cl. ............ 250/205; 250/231.13; 341/31
[58] Field of Search ............ 250/205, 231.13, 250/231.14; 356/376; 341/13, 31

[56] References Cited

U.S. PATENT DOCUMENTS

| | | | |
|---|---|---|---|
| 4,041,483 | 8/1977 | Groff | 250/231.14 |
| 4,071,131 | 1/1978 | Turek et al. | 197/6.4 |
| 4,634,859 | 1/1987 | Martell | 341/13 |
| 4,792,677 | 12/1988 | Edwards et al. | 250/231.13 |

Primary Examiner—Stephone Allen
Attorney, Agent, or Firm—Jacobson, Price, Holman & Stern, PLLC

[57] ABSTRACT

A photoelectric control structure for a linear transmission device, including a mount, a transmission gear mounted on the mount and coupled to a motor, a photoelectric circuit board mounted on the mount and having a phototransistor and an infrared light emitting diode which controls the phototransistor, a light chopper turned by the transmission gear to intermittently block light from the light emitting diode toward the phototransistor, and a chopper cover fastened to the mount and covering the light chopper and the photoelectric circuit board for protection, wherein when the motor is started, the transmission gear is driven to turn the light chopper, causing light to intermittently pass through to the phototransistor, and therefore the infrared light emitting diode intermittently drives the phototransistor to send a pulse wave signal to the signal input terminal of a satellite antenna allocator.

2 Claims, 3 Drawing Sheets

5,569,906

PHOTOELECTRIC CONTROL STRUCTURE FOR LINEAR TRANSMISSION DEVICES

BACKGROUND OF THE INVENTION

The present invention relates to linear transmission devices, and relates more particularly to a photoelectric control structure for a linear transmission device which comprises a mount, a transmission gear mounted on the mount and coupled to a motor, a photoelectric circuit board mounted on the mount and having a phototransistor and an infrared light emitting diode controlling by the phototransistor, a light chopper turned by the transmission gear to intermittently block light from the light emitting diode toward, and a chopper cover fastened to the mount and covering the light chopper and the photoelectric circuit board for protection, wherein when the motor is started, the transmission gear is driven to turn the light chopper, causing light to intermittently pass through to the phototransistor, and therefore the infrared light emitting diode intermittently drives the phototransistor to send a pulse wave signal to the signal input terminal of a satellite antenna allocator.

FIG. 3 shows a regular linear transmission device which comprises a mount 11 having a recess 12 at a suitable location, a solenoid switch 14 mounted within the recess 12, a retainer plate 16 disposed adjacent to the recess 12 to hold the solenoid switch 14 in place, and a multipolar magnet 15 disposed adjacent to the solenoid switch 14 and turned by a transmission gear (not shown). When the solenoid switch 14 is in alignment with the S or N pole at the periphery of the multipolar magnet 15, it is attracted and switched on; when the solenoid switch 14 is in alignment with non-polarity portion at the periphery of the multipolar magnet 15, it is switched off. Because this structure of a linear transmission device is of the mechanical transmission type, the mechanical mechanism wears quickly with use, causing the transmission accuracy of the device to be affected.

SUMMARY OF THE INVENTION

The present invention has been accomplished to provide a photoelectric control structure for linear transmission devices which eliminates the aforesaid problem. According to one aspect of the present invention, the photoelectric control structure comprises a mount, which comprises an axle hole, a friction-resisting plastic axle bearing mounted within the axle hole, a plurality of mounting posts, and a plurality of retaining holes; a transmission gear mounted in the axle bearing and coupled to a motor through a reduction gear; a photoelectric circuit board fastened to the mounting posts on the mount, comprising a phototransistor, an infrared light emitting diode which controls the phototransistor, and an axle hole through which the gear shaft of the transmission gear passes; a light chopper coupled to the gear shaft of the transmission gear and turned by the transmission gear to intermittently block light from the light emitting diode to the phototransistor; and chopper cover fastened to the mount and covered over the light chopper and the photoelectric circuit board, having a plurality of hooks respectively fastened to the retaining holes on the mount.

According to another aspect of the present invention, the light chopper has a plurality of light holes and a plurality of light blocking portions alternatively separated by the light holes, and the pitch between the light holes as well as the pitch between the light blocking portions are set subject to a predetermined ratio; therefore, light can be intermittently transmitted through the light holes to the phototransistor, when the light chopper is turned by the transmission gear, causing the infrared light emitting diode to drive the phototransistor to send a pulse wave signal to the signal input terminal of the satellite antenna allocator with which the linear transmission device is used.

According to still another aspect of the present invention, the chopper cover is fastened to the mount and covers the light chopper and the photoelectric circuit board, having an, which receives the light chopper, and an inside recess, which receives the phototransistor of the photoelectric circuit board.

DETAILED DESCRIPTION OF THE PREFERRED EMBODIMENT

Figure 1:
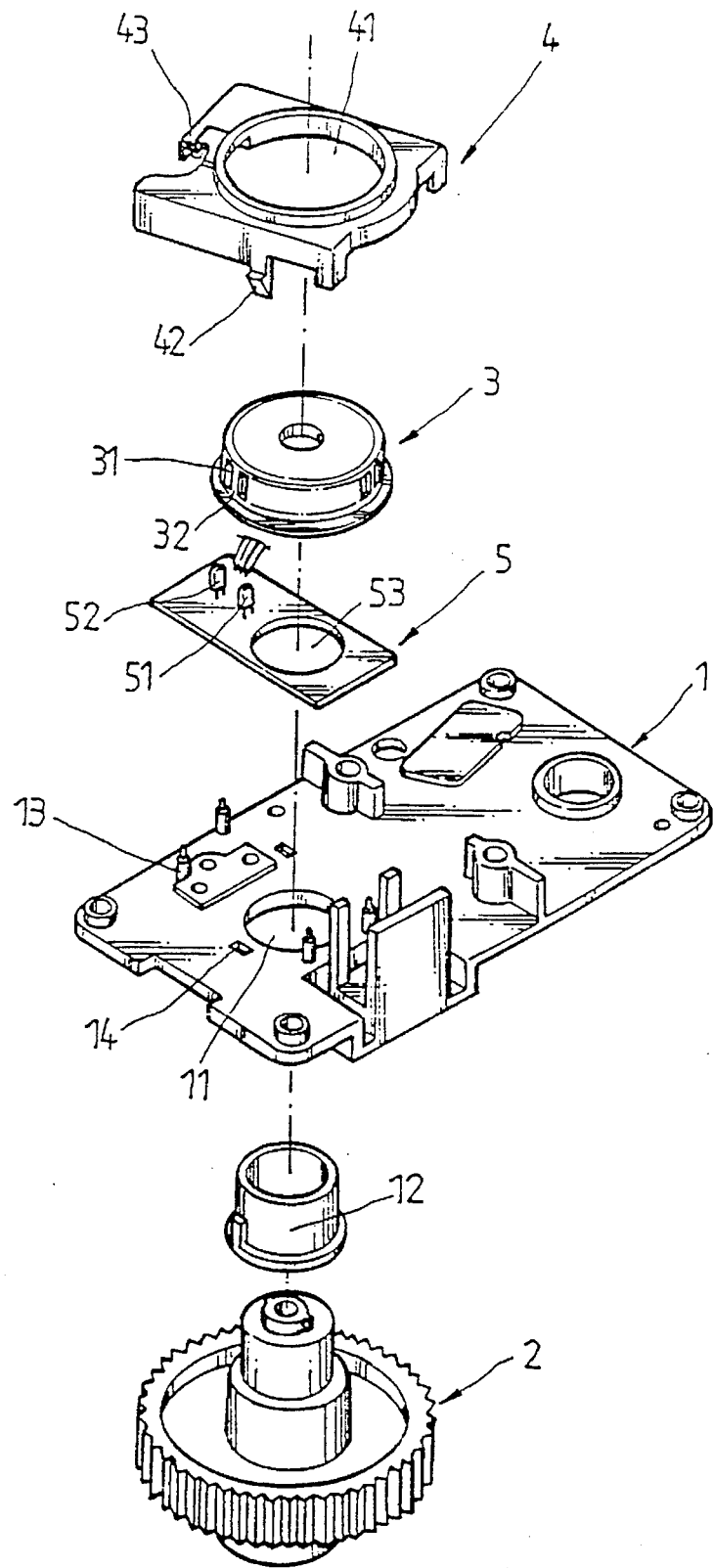
FIG. 1 is an exploded view of a photoelectric control structure according to the present invention.
Figure 2:
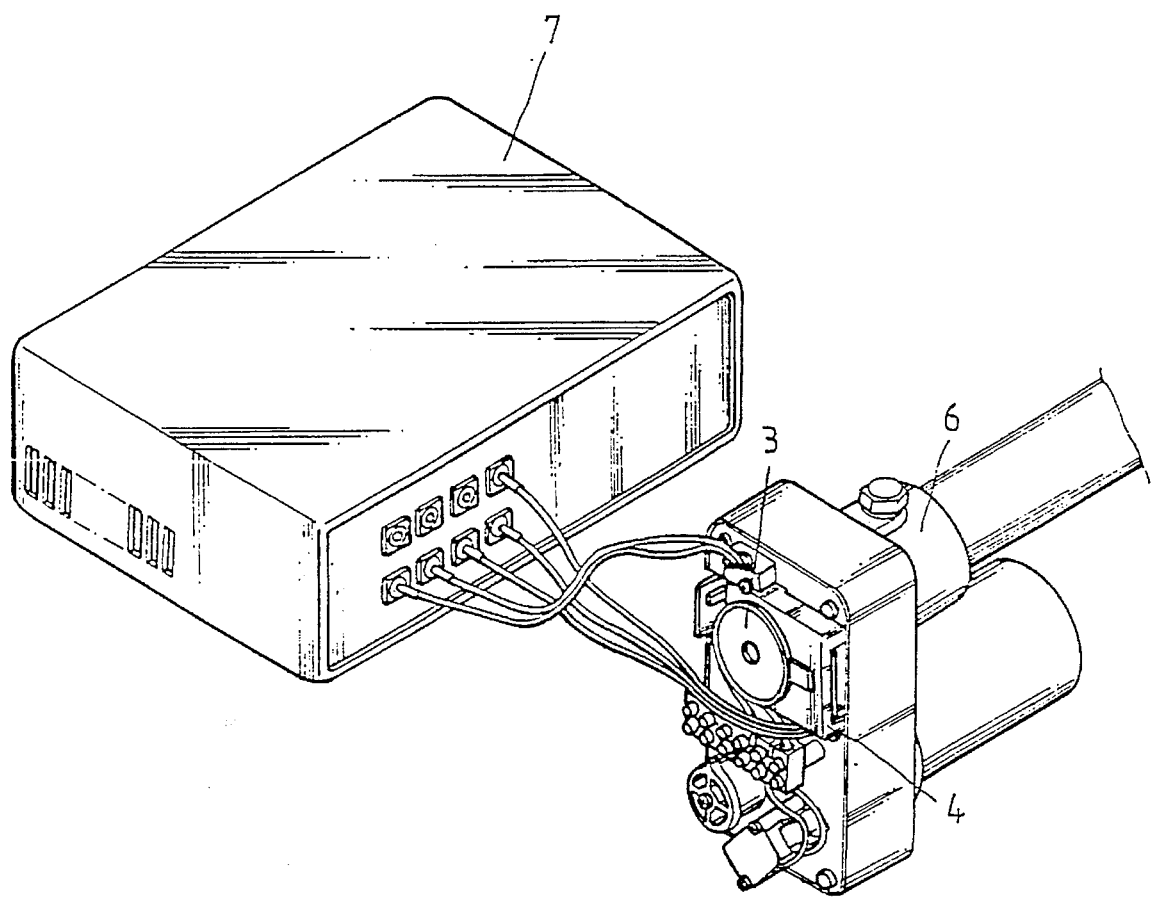
FIG. 2 shows the photoelectric control structure installed in a linear transmission device according to the present invention.
Figure 3:
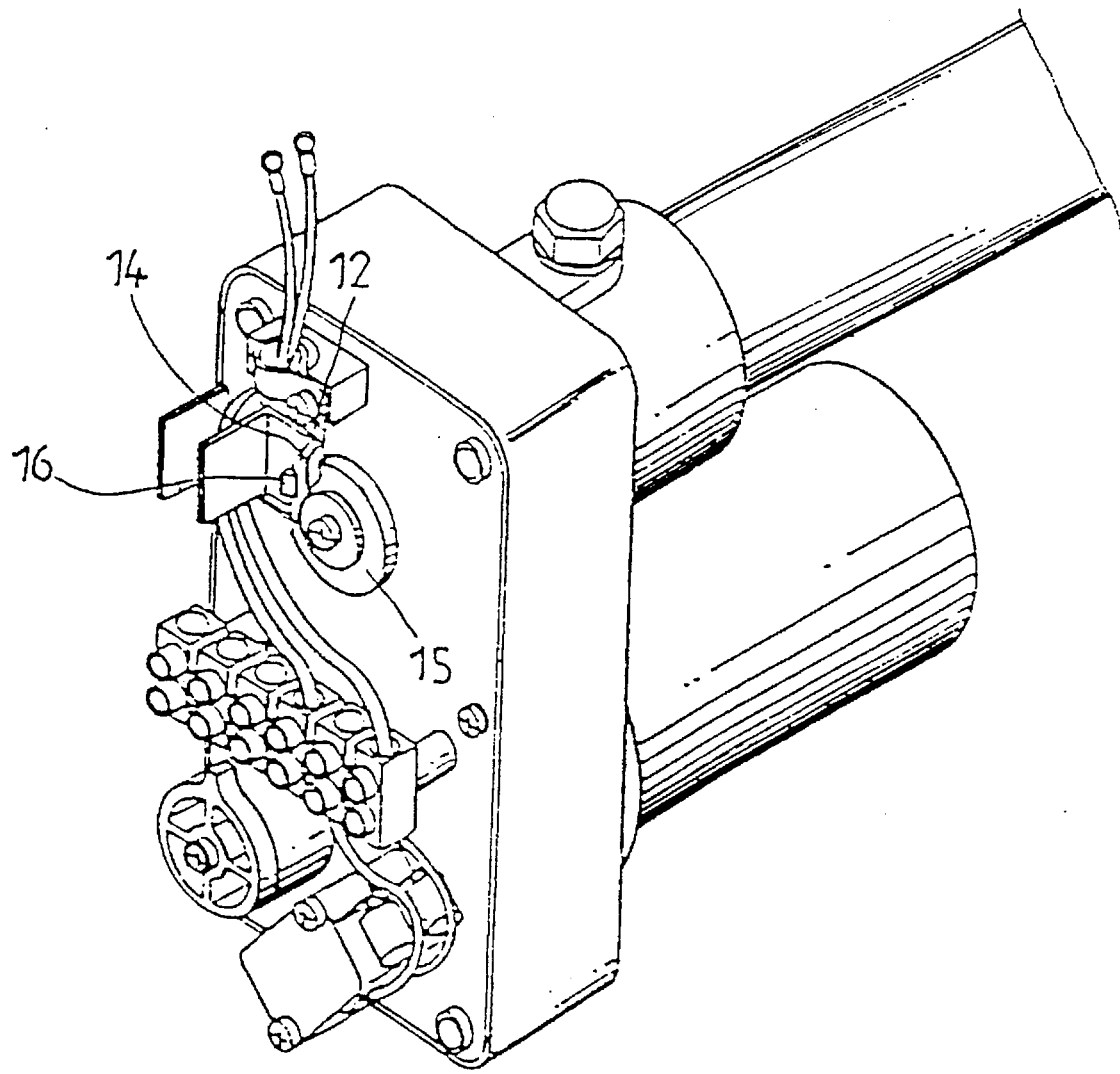
FIG. 3 shows a linear transmission device according to the prior art.

Referring to FIGS. 1 and 2, a photoelectric control structure for a linear transmission device in accordance with the present invention is generally comprised of a mount 1, a transmission gear 2, a light chopper 3, a chopper cover 4, and a photoelectric circuit board 5.

Referring to FIG. 1 again, the mount 1 comprises an axle hole 11, a friction-resisting plastic axle bearing 12 mounted within the axle hole 11 to hold the transmission gear 2, a plurality of mounting posts 13 for mounting the photoelectric circuit board 5, and a plurality of retaining holes 14 for mounting the chopper cover 4. The transmission gear 2 is coupled to a motor 6 through a reducing gear (not shown). The photoelectric circuit board 5 is fastened to the mounting posts 13 on the mount 1, comprising an infrared light emitting diode 51 and a phototransistor 52. The photoelectric circuit board 5 further comprises an axle hole 53, through which the gear shaft of the transmission gear 2 passes. The light chopper 3 is coupled to the gear shaft of the transmission gear 2 and suspended above the photoelectric circuit board 5, having a plurality of light holes 31 and a plurality of light blocking portions 32 alternatively separated by the light holes 31. The chopper cover 4 comprises a plurality of hooks 42 respectively fastened to the retaining holes 14 on the mount 1, an opening 41, which receives the light chopper 3, and an inside recess 43, which receives the phototransistor 52 of the photoelectric circuit board 5. The pitch between the light holes 31 and the pitch between the light blocking portions 32 (namely, the width of the light holes 31 and the width of the light blocking portions 32) are set subject to a predetermined ratio so that an output signal of symmetrical waveform ratio can be obtained. The installation of the chopper cover 4 greatly reduces the total height of the photoelectric control, and protects the light chopper 3 and the photoelectric circuit board 5 against impact, dust, and water.

Referring to FIGS. 1 and 2 again, when the motor 6 is started, the transmission gear 2 is driven to turn the light chopper 3, causing light to intermittently pass through the phototransistor 52, and therefore the infrared light emitting diode 51 intermittently drives the phototransistor 52 to send a pulse wave signal to the signal input terminal of the satellite antenna allocator.

It is to be understood that the drawings are designed for purposes of illustration only, and are not intended as a definition of the limits and scope of the invention disclosed.

I claim:

1. A photoelectric control structure for a linear transmission device, comprising:

a mount having an axle hole, a friction-resisting plastic axle bearing mounted within the axle hole on said mount, a plurality of mounting posts, and a plurality of retaining holes;

a transmission gear having a gear shaft at the center, said gear shaft having a front end coupled to a motor through a reducing gear and a rear end inserted through said axle bearing;

a photoelectric circuit board fastened to the mounting posts on said mount, comprising an infrared light emitting diode, a phototransistor, and an axle hole through which the rear end of said gear shaft of said transmission gear passes;

a light chopper coupled to the rear end of said gear shaft of said transmission gear and turned by said transmission gear to intermittently block light from said light emitting diode toward said phototransistor, having a plurality of light holes and a plurality of light blocking portions alternatively separated by said light holes; and a chopper cover fastened to said mount and covering said light chopper and said photoelectric circuit board, said chopper cover having a plurality of hooks respectively fastened to the retaining holes on said mount, an opening which receives said light chopper, and an inside recess which receives said phototransistor of said photoelectric circuit board;

wherein when said motor is started, said transmission gear is driven to turn said light chopper, causing light to intermittently pass through to the phototransistor, and therefore said infrared light emitting diode intermittently drives said phototransistor to send a pulse wave signal to the signal input terminal of a satellite antenna allocator.

2. The photoelectric control structure of claim 1 wherein the pitch between said light blocking portions are set subject to a predetermined ratio so that an output signal of symmetrical waveform ratio can be obtained.

* * * * *